Jan. 6, 1925.
H. W. HAYES
ARTIFICIAL CASTING MINNOW
Filed May 2, 1923
1,522,450
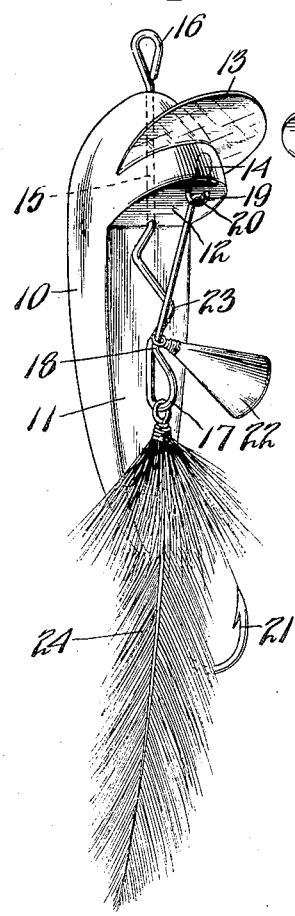
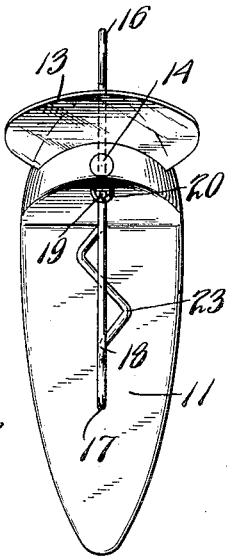
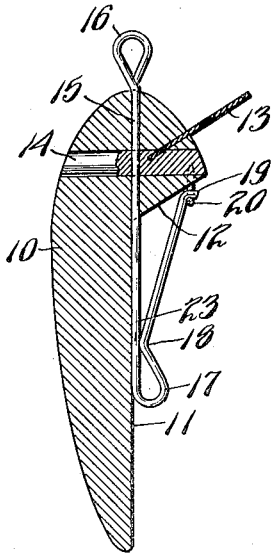
Inventor
Harry W. Hayes
By
Attorney Patented Jan. 6, 1925.

1,522,450

UNITED STATES PATENT OFFICE.

HARRY W. HAYES, OF INDIANAPOLIS, INDIANA, ASSIGNOR TO JOHN J. HILDEBRANDT COMPANY, OF LOGANSPORT, INDIANA.

ARTIFICIAL CASTING MINNOW.

Application filed May 2, 1923. Serial No. 636,173.

*To all whom it may concern:*

Be it known that I, HARRY W. HAYES, a citizen of the United States, residing at Indianapolis, in the county of Marion and State of Indiana, have invented certain new and useful Improvements in Artificial Casting Minnows, of which the following is a specification.

My said invention relates to an artificial casting minnow and it is an object of the same to provide a device of the character described provided with means permitting ready and quick disconnection of the hook or hook and sinker and attachment of other devices.

A further object of the invention is to provide an artificial minnow shaped for convenient attachment of single, double or triple hooks, and pork rind, buck-tail, tuft-feather, streamer fly or other bait.

A further object of the invention is to provide an artificial minnow with balancing means which shall bring it quickly to a natural position in the water.

Another object is to provide a shank extending through the body and having means at the forward end for attachment of a line and at the rear end for attachment of the hook and bait whereby the pull of the fish will be transmitted directly to the line by metallic connection without any chance of pulling the device to pieces.

Still another object is to provide said shank with means to prevent relative turning between the shank and the body of the minnow and to arrange it in such a way as to secure the balancing means in place.

A further object is to provide means for attaching the hook or bait in such a manner that the lateral movement of the minnow tail will not throw the bait and hook off the direct course.

Another object is to provide a minnow body of desirable conformation.

A further object is to provide an improved depressing plane on the body.

Referring to the accompanying drawings, which are made a part hereof and on which similar reference characters indicate similar parts, Figure 1 is a perspective of my device equipped with hook, bait and sinker, Figure 2, shows the underside of the device in plan, and Figure 3 is a vertical central section of the device.

In the drawings reference character 10 indicates the body of the device which is of wood or like material of substantially ovoid shape and cylindrical in cross section at the forward end. At a short distance from the forward end, preferably approximately one-third of the length of the minnow, the under part is cut away by a cut on a horizontal plane intersecting another oblique cut at an obtuse angle to the first, thus leaving the minnow with a flat horizontal under face at 11 for about two-thirds of its length and an oblique face at 12 inclined forwardly from the first face. This shape is of advantage in enameling the body as it allows a more even flow of the enamel and provides a better finished product than could be had if the face 12 were vertical.

Near the forward end of the device a saw cut is made substantially parallel to the face 12, this cut being intended to receive a plane 13 for holding the minnow under water, which in this instance is made of transparent material and preferably of celluloid, this material being inexpensive and easily shaped whereas the metallic planes hitherto utilized require numerous operations in manufacturing or assembling and are relatively expensive. Furthermore the transparent material does not corrode and spoil its appearance and it is invisible in water and therefore does not detract from the appearance of the minnow in the water. The plane is held in place by means of water-proof cement or in any other desirable way.

Just ahead of the inclined face 12 I have shown the body as provided with a vertical opening in which is located a balancing core 14 of wire solder or like material the purpose of which is to hold the body in the correct vertical position. This core preferably extends completely through the body and is held in place by a wire shank 15 located in a hole extending substantially axially of the body and having at its forward end an eye 16 for the attachment of a line. At the rear of face 12 the wire is bent to form a clasp with an eye 17 at the rear end, a bend 18 nearly closing said eye and a sharp bend at 19 near the free forward end of the wire. A staple 20 is provided for receiving the latter bend and it will be evident that by slightly flexing the movable part of the clasp the part 19 can be removed from the staple for application or replacement of hooks and sinkers. In a preferred embodiment of the invention the loop of the hook 21 is held by the eye 17 and the bend 18 serves to keep the sinker 22 at a distance from the eye of the hook and also at a distance from the bait. Due to the position of the eye 17 near the center of the minnow body the lateral movement of the tail will disturb the bait but little if at all and the bait will thus follow approximately a straight course.

In the present embodiment of the invention the shank 16 extends through a hole in the core 14 but other means may be relied on for holding the core in place, such as engagement thereof by the staple 20 which can be driven into the soft material of the core, or engagement by a part of the plane 13 as indicated in Figure 3.

To prevent relative rotation between the body of the minnow and the shank 15 which would be undesirable for obvious reasons I have shown the shank as bent in zig-zag form at 23.

I have indicated in the drawings at 24 one form of artificial bait which may be applied to the minnow but it will be obvious to those skilled in the art that any of the various forms of hook and bait such as above enumerated may be applied thereto as well as others not specified.

It will also be obvious to those skilled in the art that my device may be modified in various ways without departing from the spirit of the invention, therefore I do not limit myself to the particular embodiment of the invention shown in the drawings and described in the specification, the true scope of the invention being indicated in the appended claims.

Having thus fully described my said invention, what I claim as new and desire to secure by Letters Patent, is:

1. An artificial casting minnow having an elongated body, a balancing core for said body and a plane of transparent material secured in a cut in the under side of the body near the front end said plane being forwardly inclined and intersecting said balancing core, substantially as set forth.

2. An artificial casting minnow having an ovoid body cut away at the rear along its underside, a shank extending lengthwise of the body and substantially centrally thereof having means at the front for attachment of a line said shank being bent at the rear to provide a releasable clasp for a hook, and means to hold the clasp in closed position, substantially as set forth.

3. An artificial casting minnow having an ovoid body cut away at the rear along its underside, a shank extending lengthwise of the body having means at the front for the attachment of a line said shank being bent at the rear to provide a clasp with spaced retaining means for a hook and a sinker, and means to hold the clasp in closed position, substantially as set forth.

4. An artificial casting minnow having an ovoid body cut away at the rear along its underside, a shank extending lengthwise of the body having means at the front for the attachment of a line said shank being bent at the rear to provide a clasp for a hook, means to hold the clasp in closed position, and means to prevent relative rotation of the shank and the body, substantially as set forth.

5. An artificial casting minnow having an ovoid body cut away at the rear, a relatively heavy vertically extending balancing core therefor, and a wire shank intersecting said core and provided with eyes at front and rear for attachment of a line and a hook respectively, substantially as set forth.

6. An artificial casting minnow having an ovoid body cut away at the rear, a relatively heavy vertically extending balancing core therefor, a staple driven into the rear undercut face of the body engaging said core, and a resilient clasp secured to the underside of the body behind said staple and having a free end adapted to be engaged by said staple to prevent loss of a hook in the clasp, substantially as set forth.

7. An artificial bait comprising an elongated body having an undercut portion, a transversely mounted balancing core in said body, and a shank mounted longitudinally of said body and extending through said balancing core, substantially as set forth.

8. An artificial bait comprising an elongated body having an undercut portion, a balancing core transversely mounted in substantially the plane of the undercut portion in said body and a shank mounted longitudinally of said body and extending through said balancing core.

9. An artificial bait comprising an ovoid body cut away at the rear along its under side, a shank extending lengthwise of the body having means at the front for the attachment of a line, said shank being bent at the rear to prevent relative rotation between said shank and body and to provide a clasp for a hook, substantially as set forth.

10. An artificial bait comprising an ovoid body having a portion cut away at the rear of its under side, a shank extending lengthwise through said body and having its rear end in said cut away portion, the rear end of said shank being shaped to prevent relative rotation between the shank and body and to provide a plurality of retaining means adapted to accommodate a hook and sinker.

In witness whereof, I have hereunto set my hand and seal at Indianapolis, Indiana, this 27th day of April, A. D., nineteen hundred and twenty-three.

HARRY W. HAYES.

Witnesses:
M. L. THULER,
O. S. BOLING.